United States Patent [19]

Doyle et al.

[11] Patent Number: 5,387,660
[45] Date of Patent: Feb. 7, 1995

[54] POLYMERIZATION PROCESS

[75] Inventors: Michael J. Doyle; Willem Terlouw, both of Amsterdam, Netherlands

[73] Assignee: Shell Oil Company, Houston, Tex.

[21] Appl. No.: 24,600

[22] Filed: Mar. 1, 1993

[30] Foreign Application Priority Data

Mar. 2, 1992 [EP] European Pat. Off. ............ 92200605

[51] Int. Cl.$^6$ ............................................. C08F 4/76
[52] U.S. Cl. ........................................ 526/69; 526/79; 526/134; 528/496; 528/499; 525/270; 525/337
[58] Field of Search .................... 526/134, 69, 79; 525/270, 337; 528/496, 499

[56] References Cited

U.S. PATENT DOCUMENTS 5,276,238  1/1994  Doyle .................................. 585/511

FOREIGN PATENT DOCUMENTS 277003  8/1988  European Pat. Off. .
277004  8/1988  European Pat. Off. .
427696  5/1991  European Pat. Off. .
443686  8/1991  European Pat. Off. .

*Primary Examiner*—Mark Nagumo

[57] ABSTRACT

A process for the polymerization of ethylene and/or one or more alpha-olefins comprising contacting ethylene, and/or the alpha-olefin(s) with a catalyst comprising a first component which is a bis(cyclopentadienyl) Group IVA metal compound containing a substituent capable of reacting with a cation, and a second component which is a compound having a bulky anion containing one or more boron atoms and which is substantially non-coordinating under the reaction conditions and a cation, in which process additional first component is added.

13 Claims, No Drawings

POLYMERIZATION PROCESS

FIELD OF THE INVENTION

The present invention relates to a process for the polymerization of olefins using a catalyst comprising a bis(cyclopentadienyl) Group IVA metal compound and a compound having a bulky anion containing one or more boron atoms and a cation.

BACKGROUND OF THE INVENTION

Processes for the polymerization or co-polymerization of ethylene and/or one or more alpha-olefins comprising contacting ethylene and/or the alpha-olefin(s) with a catalyst comprising a first component which is a bis(cyclopentadienyl) Group IVA metal compound containing a substituent capable of reacting with a cation, and a second component which is a compound having a bulky anion containing one or more boron atoms and which is substantially non-coordinating under the reaction conditions and a cation, are well known in the art. Such processes are the subjects of EP-A-277003, EP-A-277004, EP-A-427696 and EP-A-443686. These processes are suitable for preparing polymers having a high molecular weight, as well as for preparing oligomers, which are products with a relatively low molecular weight, for example dimers, trimers and tetramers. In the context of this patent application the term "polymer" is therefore to be understood as including oligomers as well.

Although the catalysts used in these processes are very efficient polymerization catalysts, they possess a disadvantage in that during the course of the polymerization process the catalytic activity may decline to an unacceptably low level, so that the polymerization reaction times or run times are short, for example, up to only a few hours. Thus, the catalysts have a limited life-time and need to be discarded after having been used, because regeneration processes for the catalysts are not available. The disposal of used catalyst may contribute to environmental problems associated with the polymerization process. In addition, the catalysts comprise complex, high-value chemicals so that the catalyst costs may contribute considerably to the total costs of the polymerization process. It is therefore an object of the present invention to provide a process in which a more economic use of at least one of the catalyst components can be made.

It has now been found that when in a polymerization reaction mixture the activity of the catalyst has declined to a low level the activity can substantially be restored by adding a further quantity of the first catalyst component. By this finding, it is possible to make a more efficient use of the second catalyst component, because, for example, remnants thereof can be (re-)used by adding thereto first catalyst component. Thus, the overall supply of the second catalyst component relative to the quantity of polymer to be produced can be reduced to a very low level. It is a further merit of the present finding that the reaction time or run time of the polymerization process can be increased considerably, for example, to 400 hours and beyond.

When the polymerization reaction, and in particular the oligomerization of lower olefins to higher linear alpha-olefins, is performed in a continuous mode, the presence of active catalyst in the product leaving the reactor is detrimental to the product quality since it can further catalyze the isomerization of alpha-olefins to beta-olefins. Therefore, in a continuous-mode polymerization reaction according to the present invention it is recommended to deactivate the catalyst in the product stream leaving the reactor as a first step of product work-up. Such deactivation may be performed by adding water or a lower alcohol such as methanol, in an amount at least equimolar to that of the active catalyst. Subsequent to product work-up, the remaining solid residue can be recirculated to the reactor, together with an additional amount of the first catalyst component, which according to the present invention restores the activity of the catalyst.

SUMMARY OF THE INVENTION

The invention therefore provides a process for the polymerization or co-polymerization of ethylene and-/or one or more alpha-olefins comprising contacting the olefins(s) with a catalyst comprising a first component which is a bis(cyclopentadienyl) Group IVA metal compound containing a substituent capable of reacting with a cation, and a second component which is a compound having a bulky anion containing one or more boron atoms and which is substantially non-coordinating under the reaction conditions and a cation, during which process further first component is added.

The invention further provides a process as defined hereinabove, characterized in that it is a continuous-mode process, whereby the catalyst present in the product stream leaving the reactor used is deactivated before work-up of the product, and the solid residue remaining after work-up of the product is recirculated to the reactor.

DESCRIPTION OF THE PREFERRED EMBODIMENTS

It is known that in isolation both catalyst components possess virtually no polymerization activity and that polymerization activity can be achieved by combining the catalyst components which combination leads to an irreversible formation of the active catalyst species. Furthermore, the components can be combined in substantially equimolar quantities, in which case they are (almost) completely consumed as a result of the formation of the catalyst. It is therefore surprising that the catalyst activity can practically be restored by the addition of a fresh portion of only one of the catalyst components, viz. the metal containing first component. It is also surprising that it is not necessary to remove constituents of the used catalyst or to remove a catalyst poison from the polymerization mixture prior to addition of the catalyst component. It is also not necessary to add the second component of the catalyst in order to restore the catalyst activity.

In the process of the invention, the starting monomers may comprise normally gaseous olefins, such as ethene. These may be supplied in the form of a gas, optionally together with an inert diluent such as nitrogen or helium. The alpha-olefins are suitably alpha-olefins comprising up to 10 carbon atoms, such as 1-butene, 4-methyl-1-pentene, 5,5-dimethyl-1-hexene, styrene or allylbenzene, dependent on the desired polymerization product. Particularly suitable alpha-olefins comprise up to 6 carbon atoms.

When a mixture of olefins is used in the polymerization, the relative proportions of the olefins present in the reaction mixture may vary between wide limits. Ethene and/or the further olefin(s) may be supplied at the initial stage of the polymerization. They may also be supplied over a period of time, for example at such a rate that consumed olefins are replenished. In the case that oligomeric alpha-olefins are intended to be prepared by copolymerization of ethene and one or more alpha-olefins using the process of the invention, it is preferred that the starting alpha-olefin(s) is/are present in a quantity of at least about 1 mole per mole of ethene, more preferably in a quantity of from about 20 to about 1000 moles per mole of ethene, in particular from about 50 to about 500 moles per mole of ethene.

To effect polymerization, the reaction is suitably carried out at elevated temperatures, preferably in the range of from about 20° C. to about 175° C., more preferably from about 50° C. to about 150° C. The reaction is suitably carried out under conditions of moderate elevated pressure, preferably in the range of from about 1 bar to about 100 bar, more preferably from about 5 bar to about 60 bar. The optimum conditions of temperature and pressure used for a particular catalyst to maximize the yield of the desired polymer can readily be established by those skilled in the art.

The catalyst may comprise a first component which is a bis(cyclopentadienyl) Group IVA metal compound containing a substituent capable of reacting with a cation, and a second component which is an ionic combination of a bulky anion containing a plurality of boron atoms and a proton-donating cation, the anion being such that it is substantially non-coordinating under the reaction conditions employed. Thus, it is intended that the anion should not coordinate, or at least coordinate only weakly, to the bis(cyclopentadienyl) metal entity which is formed by reaction of the donated proton and the acceptor group of the first compound. Metals of Group IVA are as defined in the Periodic Table of the Elements published in Kirk-Othmer, Encyclopaedia of Chemical Technology, 2nd edition, Vol. 8, p. 94.

First components of the catalyst are typically compounds of zirconium or hafnium. The compounds preferably have the formula $(Cp)_2MR_1R_2$ wherein each group Cp, which may be the same or different, represents a cyclopentadienyl group which may or may not be substituted with hydrocarbyl groups, M represents the Group IVA metal atom, typically zirconium or hafnium, and $R_1$ and $R_2$, which may be the same or different, each represent a hydrogen atom or a substituted or unsubstituted hydrocarbyl group.

Preferably, the groups Cp are the same. The groups Cp may or may not be connected to each other by a bridging group. The optional hydrocarbyl substituent(s) of the cyclopentadienyl group are typically (cyclo)alkyl and/or arylalkyl groups, preferably alkyl groups, in particular alkyl groups having up to 5 carbon atoms, more in particular they are methyl groups. Eligible cyclopentadienyl groups are penta-substituted, such as in pentaalkylcyclopentadienyl. Very good results can be achieved when both cyclopentadienyl groups are pentamethylcyclopentadienyl groups. $R_1$ and $R_2$ are preferably alkyl groups, typically containing up to 5 carbon atoms, such as methyl.

The second component preferably contains, as the boron containing substantially non-coordinating anion, a carborane anion, suitably a carborane anion of formula $B_{11}CH_{12}-$, while the cation is preferably a proton donating cation, more preferably a quaternary ammonium cation such as a trialkylammonium cation, for example tri-n-butylammonium cation. Alternatively, the cation may be a metal cation, such as a silver ion or a triphenylcarbenium ion. Other bulky boron containing anions may be used such as a tetra(perfluorophenyl)boron anion.

The catalyst may be formed in situ or may be formed initially prior to introduction to a polymerization vessel by mixing together the two components, preferably in solution in a solvent such as toluene to form a liquid catalyst system. The two compounds are most preferably employed in substantially equimolar quantities. The first component and the second component are typically employed in a molar ratio within the range of from about 0.01 to about 500, more typically from about 0.1 to about 20. Ratios outside the latter range are possible as well. The quantity of catalyst preferably employed in the reaction mixture is within the range of from about $10^{-1}$ to about $10^{-7}$ gram mole, in particular about $10^{-3}$ to about $10^{-5}$ gram mole, of the second component per mole of ethylene and/or alpha-olefin.

The polymerization is generally, although not necessarily, carried out in an inert liquid solvent which is suitably also the solvent for the catalyst components. The reaction can be carried out in batch or continuous operation. Reaction times or run times of more than 1 minute, preferably exceeding 5 hours up to 400 hours and more, have been found to be suitable. The reaction is preferably carried out in the absence of oxygen and moisture.

During the process of the invention, loss of catalyst activity is neutralized by adding further first component. Various known methods can be used to monitor the catalyst activity during the polymerization. Given, for example, the applied polymerization conditions and the olefins being polymerized, a skilled person will be able to select a suitable polymerized, a skilled person will be able to select a suitable method for monitoring the catalyst activity. The addition of further first component can be carried out after complete loss or after partial loss of the catalyst activity. One may choose to add further first component gradually over a certain period of time thus keeping the catalyst activity at a more or less constant level. It is also possible to remove polymer product from the polymerization mixture before adding further first component.

The further first component added may be different from the first component upon which the catalyst is based. When a different first component is selected, the catalyst activity can be restored at a level which is different from the level in the initial stages of the polymerization process. It may be advantageous to apply a different first component when it is envisaged to produce, after restoring the catalyst activity, a polymer which is different from the polymer which is produced prior to restoring the catalyst activity. However, in most instances it is preferred that the further first component is the same as the first component upon which the catalyst is based.

The quantity of further first component added to neutralize loss of catalyst activity may depend on the level of catalyst activity one may want to establish. Typically, further first component can be added until a molar ratio of further first component to the second component of up to about $10^6:1$ has been effected in the reaction mixture, more typically until the molar ratio of the further first component to the second component is up to about $10^4:1$. An eligible minimum quantity of further first component may be about 0.01 mole per mole of the second component, suitably about 0.1 mole per mole of the second component.

Additional first component can be supplied directly into the polymerization reaction mixture, in particular when the polymerization process is a batch process. In continuous polymerization processes it may be especially advantageous to add further first component to boron-containing catalyst remnants which are obtained from the polymerization mixture, and which are recycled to said polymerization mixture. These boron containing remnants may be obtained by removal of polymer product from the reaction mixture, for example, by filtration when the polymer has a high molecular weight or by evaporation when the polymer has a low molecular weight. In order to avoid the build-up of catalytically inactive products which originate in the additional first component, it may be advantageous to apply a bleed stream containing such inactive products and, when desired, to add further second component in such a quantity as to contain substantially the same quantity of boron as removed via said bleed stream. In particular in continuous polymerization processes the bleed and the addition of further second component are preferably applied substantially simultaneously and in a continuous way.

The polymerization products, for example high molecular weight polymers or mixed alpha-olefins having a chain length of from 5 to 24 carbon atoms, are suitably recovered by conventional methods. A skilled person will be able to select the techniques which are eligible for the recovery of the particular type of polymer. If desired, unconverted starting material and product having a molecular weight which is lower than the desired molecular weight may be recovered and recycled to be used as starting material in a subsequent polymerization reaction.

The invention will now be further described with reference to the following examples which are illustrative and are not intended to be construed as limiting the scope of the invention.

The examples were carried out with substantial exclusion of air and moisture. The quantity of polymer formed was determined by filtering a sample of the reaction mixture, weighing the solid material obtained (from which the yield of insoluble polymer could be calculated) and subjecting the filtrate obtained to gas chromatographic analysis (from which the yield of soluble polymer could be calculated). In each of the Examples (except for Example 5) the sum of the yields of insoluble and soluble polymers has been given.

EXAMPLE 1 (for comparison)

A solution of 0.001 mole of bis(Pentamethylcyclopentadienyl)zirconium dimethyl in 300 ml toluene was stirred at 90° C. in an autoclave. The autoclave was pressurized with ethene to 10 bar which pressure was maintained by supplying ethene, so that ethene consumed in the reaction could be replenished. After 30 minutes 0.04 g polymer was formed.

At that point in time 0.00001 mole of tri-n-butylammonium 1-carbadodecaborate, dissolved in a small volume of toluene, was added to the reaction mixture. After stirring under ethene pressure for an additional period of 30 minutes 10 g of polymer product was formed.

EXAMPLE 2 (for comparison)

A solution of 0.0005 mole of tri-n-butylammonium 1-carbadodecaborate in 100 ml toluene containing 34 g of propene was stirred at 120° C. in an autoclave. The autoclave was pressurised with 10 g of ethene to obtain a total pressure of 30 bar which pressure was maintained by supplying additional ethene, so that ethene consumed in the reaction could be replenished. After 30 minutes substantially no polymer was formed.

At that point in time 0.0003 mole of bis(pentamethylcyclopentadienyl)zirconium dimethyl, dissolved in a small volume of toluene, was added to the reaction mixture. After stirring under ethene pressure for an additional period of 20 minutes 58 g of polymer product was formed.

EXAMPLE 3

A solution of 0.00005 mole of tri-n-butylammonium 1-carbadodecaborate in 50 ml toluene containing 82 g of propene and 0.1 g of ethene was stirred at 100° C. in an autoclave while the resulting total pressure of 31 bar was maintained by supplying additional ethene, so that ethene consumed in the reaction could be replenished. A solution of 0.0002 mole of bis(Pentamethylcyclopentadienyl)zirconium dimethyl in a small volume of toluene was added. After 90 minutes 2 g of polymer product was formed. No additional polymer was formed during the subsequent period of 2 hours, indicating that the catalyst had become inactive.

After having left the mixture overnight, stirring under ethene pressure was resumed and 0.0001 mole of bis(pentamethylcyclopenta dienyl)zirconium dimethyl in a small volume of toluene was added. After stirring for an additional 3 hours an additional quantity of 2.4 g polymer was formed.

EXAMPLE 4

A solution of 0.00015 mole of tri-n-butylammonium 1-carbadodecaborate in 100 ml toluene containing 200 ml of 1pentene and 1 g of ethene was stirred at 150° C. in an autoclave while the resulting total pressure of 11 bar was maintained by supplying additional ethene, so that ethene consumed in the reaction could be replenished. A solution of 0.0004 mole of bis(pentamethylcyclopentadienyl)hafnium dimethyl in a small volume of toluene was added. During the subsequent 2.5 hours 20 g ethene was supplied and 51.4 g of polymer product was formed. During this period of time it was seen that the rate of ethene supply slowly decreased to a level of practically zero, indicating that the catalyst became inactive.

A solution of 0.0003 mole of bis(pentamethylcyclopentadienyl)hafnium dimethyl in a small volume of toluene was subsequently added after which it was seen that the ethene consumption resumed. During the subsequent period of 2 hours 16 g of ethene was supplied and 27.2 g of polymer was formed additionally. Again it was seen that during this period of time the rate of ethene consumption slowly decreased to a level of practically zero, indicating that the catalyst became inactive again.

An additional quantity of 0.0003 mole of bis(pentamethylcyclopentadienyl)hafnium dimethyl dissolved in a small volume of toluene was subsequently added after which it was seen that the ethene consumption resumed. During the subsequent period of 1 hour 3 g of ethene was supplied and 8.8 g of polymer was additionally formed.

EXAMPLE 5 (for comparison)

A solution of 0.00005 mole of tri-n-butylammonium 1-carbadodecaborate in 100 ml toluene containing 5.2 g of ethene was stirred at 125° C. in an autoclave while the resulting total pressure of 10 bar was maintained by supplying additional ethene, so that ethene consumed in the reaction could be replenished. A solution of 0.0002 mole of bis(pentamethylcyclopentadienyl)zirconium dimethyl in a small volume of toluene was added. During the subsequent period of 3 hours 32.8 g of ethene was supplied and 20.5 g of soluble polymer product and some insoluble polymer were formed. During this period of time it was seen that the rate of ethene supply slowly decreased to a level of practically zero, indicating that the catalyst became inactive.

A solution of 0.0002 mole of tri-n-butylammonium 1-carbadodecaborate in a small volume of toluene was subsequently added after which it was seen that the ethene consumption did not resume within an additional period of three hours and that, accordingly, no additional polymer was formed.

EXAMPLE 6

Step 1: A solution of 0.005 mole of tri-n-butylammonium 1-carbadodecarborate in 70 ml toluene was stirred in an autoclave at 40° C. Ethene was supplied with a total pressure of 40 bar in such a way that ethene consumed in the reaction could be replenished. Then, a solution of 30 ml toluene containing 0.0025 mole of bis(tert-butylcyclopentadienyl)dimethyl hafnium was injected into the reactor. After 25 minutes 20 g of ethene was converted to polymer.

Step 2: 0.005 mole of water was added to stop the reaction whereafter no further reaction was observed over a period of 16 hours.

Step 3: The autoclave effluent, containing toluene, water, deactivated catalyst and polymer, was then transferred to a round bottom flask and purged with nitrogen until a small amount of solid residue remained.

Step 4: This residue was dissolved in 70 ml of toluene and transferred into the autoclave. The temperature was set at 40° C. and the autoclave pressurized with ethene to 40 bar. Then, 30 ml toluene containing 0.0025 mole bis(tert-butylcyclopentadienyl)dimethyl hafnium was injected into the autoclave. After 25 minutes, 21 g ethene was converted to polymer.

Step 2, 3 and 4 were repeated in the same way and this time 17 g of ethene were converted to polymer in 25 minutes.

EXAMPLE 7

A solution of 0.0005 mole tri-n-butylammonium 1 carbadodecaborate in 70 ml toluene was stirred in an autoclave at 40° C. The autoclave was pressurized with ethene to 40 bar. The pressure was kept constant by replenishing consumed ethene. A solution of 30 ml of toluene containing 0.0005 mole bis(tert-butylcyclopentadienyl)dimethyl hafnium was then injected into the autoclave. After 25 minutes, 7 g ethene was converted to polymer. An amount of 0.002 mole methanol was added to the reaction mixture whereupon the reaction stopped. In the following sixteen hours there was no observable reaction. The autoclave effluent, containing toluene, methanol, deactivated catalyst and polymer was then transferred to a round bottom flash. Low boiling components were then evaporated using a nitrogen purge to leave a residue. To this residue 10 ml dry and oxygen free methanol was added and this mixture was agitated at 80° C. for 5 minutes. The mixture was then cooled to room temperature whereupon two phases were formed. The methanol phase was separated and transferred to a second flask. This methanol extraction procedure was repeated three times and the collected methanol fractions were distilled under high vacuum. The residue was dissolved in 70 ml of toluene and transferred to the autoclave. The autoclave was heated to 40° C. and pressurized with ethene to 40 bar. An amount of 0.005 mole bis(tert-butylcyclopentadienyl)dimethylhafnium was dissolved in 30 ml of toluene and injected into the autoclave. After a period of 27 minutes, 7 g of ethene was converted into polymer.

What is claimed is:

1. A process for the polymerization of ethylene and/or one or more alpha-olefins comprising contacting and reacting in a reactor the olefin(s) with a catalyst comprising a first component having a formula $(Cp)_2MR_1R_2$ wherein Cp represents a cyclopentadienyl group, M represents a Group IVA metal atom, and $R_1$ and $R_2$ each represent hydrogen Or a hydrocarbyl group, and a second component which is a compound having a bulky anion containing one or more boron atoms and which is substantially non-coordinating under the reaction conditions, and a cation, to produce a product stream, wherein during said process additional first component is added, and wherein said process is a continuous-mode process in which said catalyst present in the product stream leaving the reactor is deactivated prior to work-up of the product, and solid residue present following work-up of the product is recirculated to said reactor.

2. The process according to claim 1, wherein the deactivation is performed by adding to the product stream water in an amount which is at least equimolar to the amount of active catalyst present.

3. The process according to claim 1, wherein the deactivation is performed by adding to the product stream a lower alcohol in an amount which is at least equimolar to the amount of active catalyst present.

4. The process according to claim 1, wherein the first component is a compound of the formula $(Cp)_2MR_1R_2$ wherein each group Cp, which can be the same or different, represents a cyclopentadienyl group which can be unsubstituted or substituted with hydrocarbyl groups, M represents the Group IVA metal atom, and $R_1$ and $R_2$, which may be the same or different, each represent a hydrogen atom or a substituted or unsubstituted hydrocarbyl group.

5. The process according to claim 4, wherein each group Cp represents a pentaalkylcyclopentadienyl group and $R_1$ and $R_2$ are each alkyl groups.

6. The process according to claim 1, wherein the Group IVA metal is selected from the group consisting of zirconium and hafnium.

7. The process according to claim 1, wherein the second component comprises a carborane anion as the substantially non-coordinating anion.

8. The process according to claim 1, wherein the second component comprises a proton-donating cation.

9. The process according to claim 8, wherein the second component is a trialkylammonium carborane, the carborane anion being represented by the formula $B_{11}CH_{12}^-$.

10. The process according to claim 1, wherein the catalyst comprises the first component and the second component in a molar ratio in the range of from about 0.1 to about 20.

11. The process according to claim 1, wherein ethene is copolymerized with one or more alpha-olefins and the ratio of the alpha-olefin(s) to ethene is within the range of from about 50 to about 500 moles per mole ethene.

12. The process according to claim 1, wherein the polymerization reaction is carried out at a temperature within the range of from about 50° C. to about 150° C.

13. The process according to claim 1, wherein the polymerization reaction is carried out at a pressure in the range of from about 5 bar to about 60 bar.

* * * * *